No. 876,999. PATENTED JAN. 21, 1908.
G. T. REISS.
FACING TOOL.
APPLICATION FILED APR. 29, 1907.
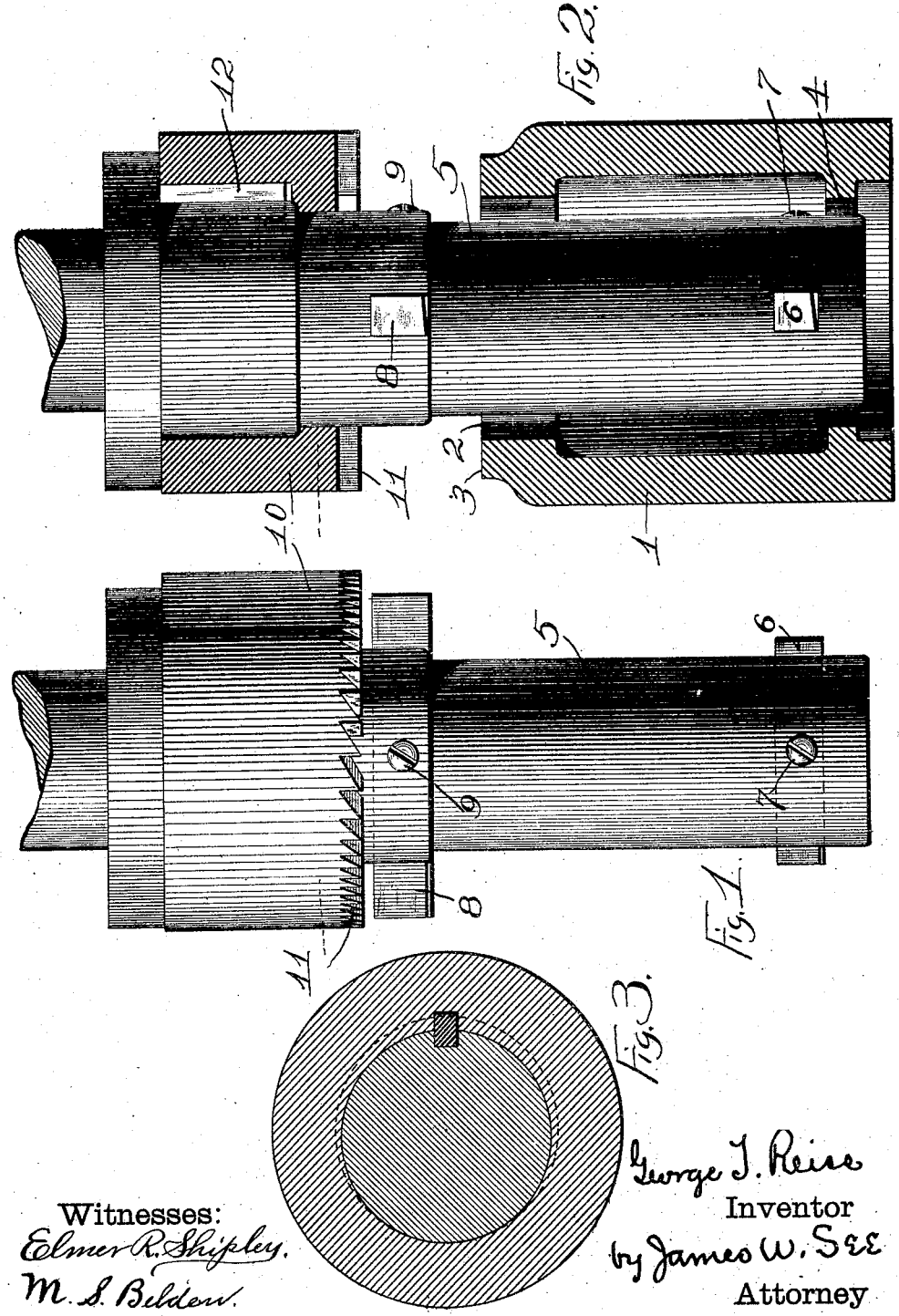
Witnesses:
Elmer R. Shipley.
M. S. Belden.
George T. Reiss
Inventor
by James W. See
Attorney

UNITED STATES PATENT OFFICE.

GEORGE T. REISS, OF HAMILTON, OHIO, ASSIGNOR TO NILES-BEMENT-POND COMPANY, OF JERSEY CITY, NEW JERSEY.

FACING-TOOL.

No. 876,999.

Specification of Letters Patent.

Patented Jan. 21, 1908.

Application filed April 29, 1907. Serial No. 370,793.

*To all whom it may concern:*

Be it known that I, GEORGE T. REISS, a citizen of the United States, residing at Hamilton, Butler county, Ohio, have invented certain new and useful Improvements in Facing-Tools, of which the following is a specification.

This invention will be readily understood from the following description taken in connection with the accompanying drawing in which:—

Figure 1 is a side elevation of a tool embodying my invention: Fig. 2 is a side elevation of the same, part vertical section, in conjunction with a sample piece to be worked upon: and Fig. 3 a horizontal section of the tool.

In the drawing:—1, indicates a sample piece of work, in this case a header for a water-tube boiler, to be faced, and also bored, the piece consisting of a hollow casting: 2, a circular opening in the top of the casting, this opening not necessarily to be bored: 3, the top of the casting, to be accurately faced around the opening 2: 4, a circular opening in the lower part of the casting, concentric with and of smaller diameter than opening 2, the opening 4 to be bored: 5, the tool bar, the same being adapted to be carried and rotated by any suitable machine as, for instance, any suitable drilling or boring machine arranged to feed the tool bar to the work, or, alternatively, to feed the work relative to the tool bar: 6, a bar cutter secured in a mortise across the tool bar, this cutter being a boring cutter suited to the diameter of opening 4: 7, a set-screw for securing this cutter in the tool bar: 8, a bar cutter secured in a mortise extending across the tool bar, this cutter being a facing cutter and having a length suited to the proper facing of top 3 of the casting, the distance between bar cutters 6 and 8 being such that cutter 6 may complete its work in boring the opening 4 before the cutter 8 reaches the top of the casting to begin work thereon: 9, a set-screw for securing cutter 8 in the tool bar: 10, a flat faced milling collar secured to the tool bar above bar cutter 8, this milling collar fitting snugly on the tool bar and having its bore eccentric to its periphery, the diameter of this milling collar being in excess of the diameter of the top of the casting which is to be faced: 11, the milling teeth on the lower rim of the milling collar: and 12, a key or feather to cause the milling collar to turn with the tool-bar.

In using this device on a piece of work of the character illustrated, bar-cutter 6 first bores the opening 4 and, after this boring has been completed, bar cutter 8 is brought down to the face 3 of the casting and faces it off, this cutter dealing with the casting in its rough form and dealing with the scale and preliminary heavy work of facing. When this cutter has done its work then cutter 8 is removed, by simply loosening setscrew 9 and withdrawing the cutter, the cutter 8 and its set-screw 9 being entirely free from the milling collar after which the milling collar is brought down to the work, its milling teeth putting the final and accurate finish on the face 3 of the casting, thus completing the operation. Opening 2 in the casting, which may not need boring, is to be large enough to permit the cutter 6 to pass freely through it.

Milling collar 10 remains permanently on the tool-bar, being removed only for purposes of renewal or reparation. If the milling collar were concentric, and if, in its production, a defect, as a slight notch, should be produced in its lower tool face, the chances would be that that defect would extend all the way around the collar and the result would be that an annular ridge would be formed on the face 3, interfering with the desired accuracy of face. But, the milling collar being eccentric, a continuous notch of the character referred to might exist without impairing the accuracy of the facing for, the circle of the notch being eccentric to the axis of rotation of the collar, the notch would be at different radial distances in the various teeth and one tooth would be able to act fairly on and remove a ridge left by a preceding tooth even if it were itself notched.

I claim:—

5. A facing tool comprising a rotatable tool bar provided with a diametrical mortise, a bar-cutter separably secured in said mortise and projecting endwise therefrom, a milling collar firmly secured to the tool-bar above said bar-cutter and having a toothed lower face, and means for securing said bar-cutter in its mortise, said bar-cutter and its securing means being free of said milling-collar, combined substantially as set forth.

GEORGE T. REISS.

Witnesses:
WILLARD SEE,
M. S. BELDEN.